United States Patent [19]

Cicare

[11] Patent Number: 5,678,999
[45] Date of Patent: Oct. 21, 1997

[54] SYSTEM FOR TRAINING HELICOPTER PILOTS

[76] Inventor: Augusto Ulderico Cicare, Bartolomé Mitre 3224, Saladillo - Provincia de Buenos Aires, Argentina

[21] Appl. No.: 511,966

[22] Filed: Aug. 7, 1995

[30] Foreign Application Priority Data

Aug. 8, 1994 [AR] Argentina ................. 329014

[51] Int. Cl.$^6$ ........................... G09B 9/46
[52] U.S. Cl. ........................... 434/33; 434/55
[58] Field of Search ................. 434/32, 33, 55

[56] References Cited

U.S. PATENT DOCUMENTS

| | | | |
|---|---|---|---|
| 1,825,462 | 9/1931 | Link, Jr. | 434/55 |
| 2,711,594 | 6/1955 | Hickey | 434/33 |
| 3,137,500 | 6/1964 | Stensager | 434/33 |
| 3,246,403 | 4/1966 | Vaughen | 434/33 |
| 3,279,096 | 10/1966 | Emigh | 434/33 |
| 3,818,612 | 6/1974 | Myles | 434/33 |
| 3,818,613 | 6/1974 | Julian et al. | 434/33 |
| 4,120,099 | 10/1978 | Fett | 434/33 |
| 4,601,663 | 7/1986 | Allison et al. | 434/33 |
| 5,490,784 | 2/1996 | Carmein | 434/55 |
| 5,533,935 | 7/1996 | Kast | 434/55 |

*Primary Examiner*—Paul J. Hirsch
*Attorney, Agent, or Firm*—Bachman & LaPointe, P.C.

[57] ABSTRACT

The invention relates to a system for training helicopter pilots, more particularly to a system to be used as a highly efficient means for complementing present methods for training pilots. The object of the invention is avoiding the stress to which the trainee is subjected during the first flights and providing understanding of the helicopter behavior easily and without risk. The invention proposes a system basically comprised by a structure and a conventional helicopter permitting simulating stationary or translational actual flight without separating from the ground. The structure comprises a shiftable base having a support for free rotation of a frame from which the helicopter is suspended, so that it may raise and lower within set limits and also that it may be tilted to the sides in a restricted way. This giving the possibility of practicing various maneuvers, also considerably reducing the training cost.

15 Claims, 5 Drawing Sheets

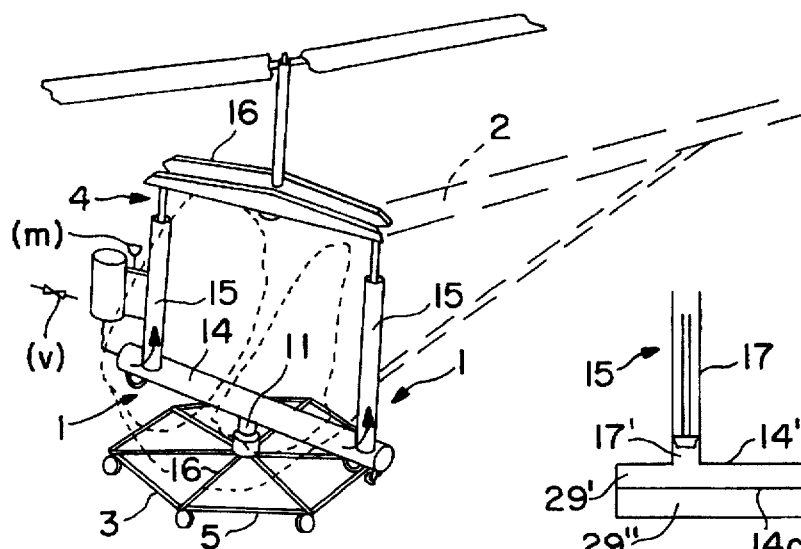
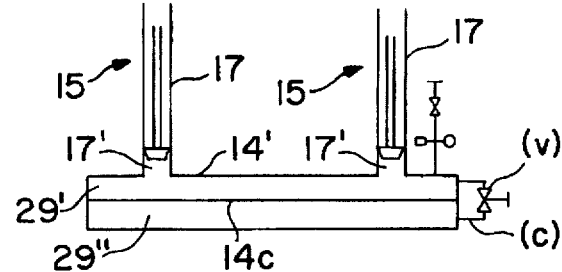
FIG. 1    FIG. 11
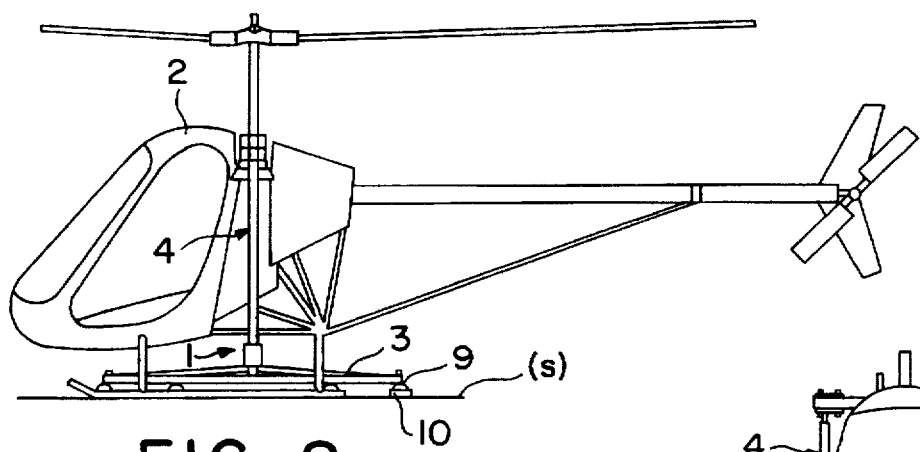
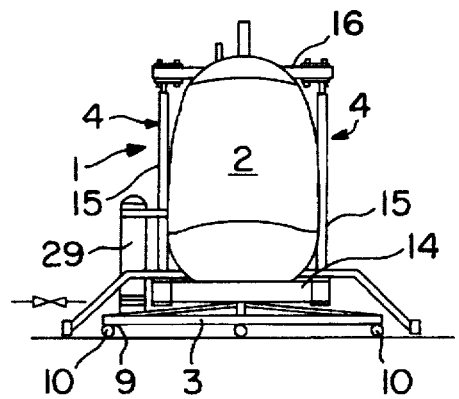
FIG. 2    FIG. 4
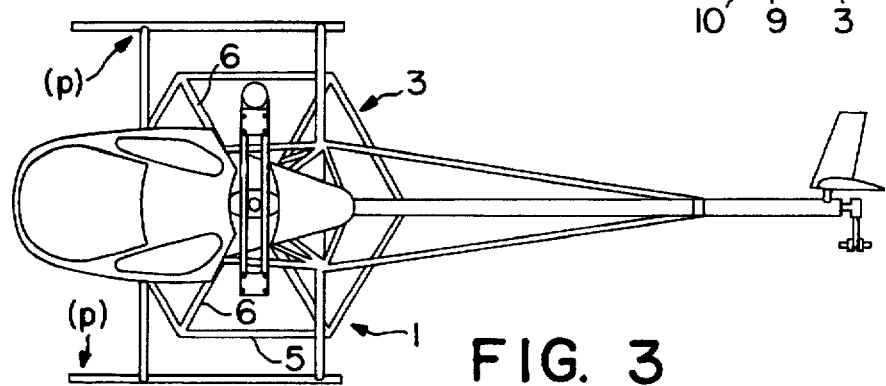
FIG. 3

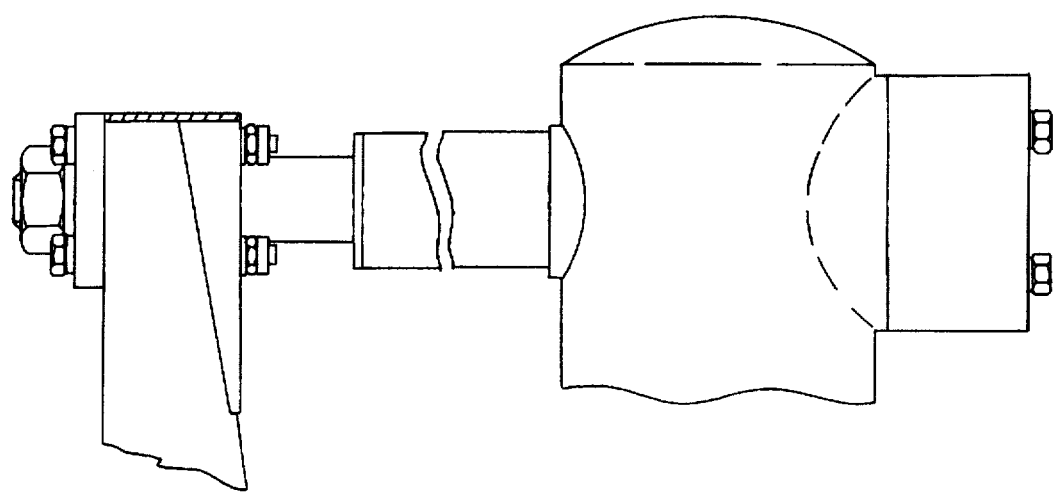
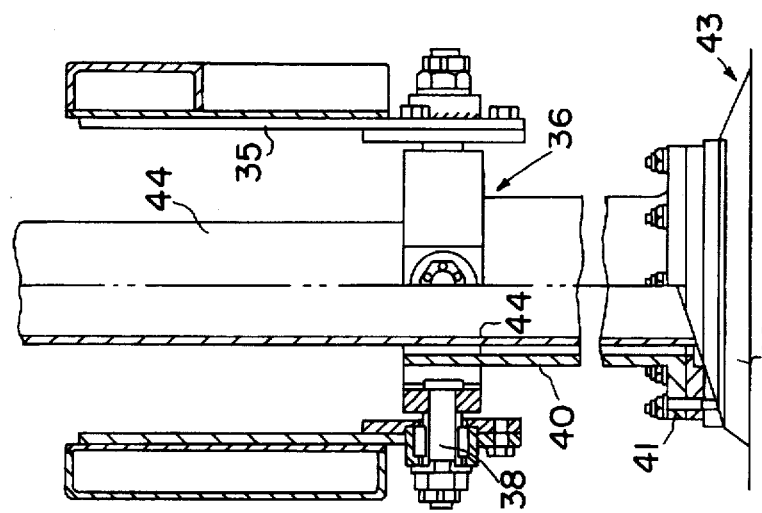
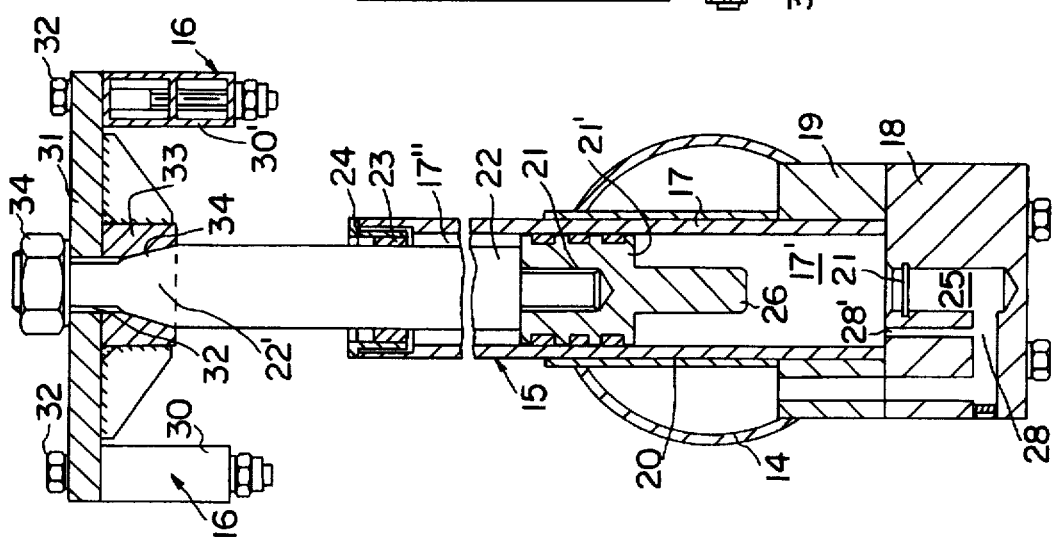

SYSTEM FOR TRAINING HELICOPTER PILOTS

BACKGROUND OF THE INVENTION

The instant invention relates to a system for training helicopter pilots, more particularly to a system to be used as a highly efficient means for complementing present methods for training pilots.

The proposed system allows simulating, without raising from the floor, the behavior of helicopters during actual flight and also simulating different operating conditions thereof without any risk for the users. These operating conditions, similar to actual ones, may be stationary flights or low speed moving flights, commanding the helicopter at all times in a manner identical to that of a true flight.

The system of the invention is a combination comprised by a structure, having means for suspending a helicopter in several positions as selected; and by a conventional helicopter to which some modifications have been introduced, in order to adapt it to said structure, without substantially changing its conventional features.

The assembly so formed gives the helicopter a series of freedom levels allowing simulating the behavior thereof during true flight without raising from the floor and without any risk implying the persons involved, under normal conditions as well as under emergency conditions, thus constituting a safe and economical means for complementing conventional training methods.

PRIOR ART

No system or apparatus of this type is known at present, and the only references which could be mentioned for flight practice are the use of training apparatus limited to the operation of command devices and of practice and knowledge of command boards of this kind of plane. Generally, training is carried out during actual flights, by highly skilled personnel, and wherein the trainee may observe different flight conditions, such as raising, lowering, shifting, etc, but always with the risk of an accident which may affect the trainer as well as the trainee.

SUMMARY OF THE INVENTION

The object of the invention is avoiding and solving the mentioned disadvantages, by means of a safe and economical system, which complements existing methods and allows the trainee to become familiar with commands and sensitivity of the helicopter during its different movements similar to those of a actual flight, without raising from the ground, which implies the total elimination of risks due to lack of experience.

As mentioned, the system of the invention comprises, in combination, a helicopter supporting and suspension structure and a conventional helicopter, said structure being comprised by two parts, a lower and an upper part, respectively, engaged by pneumatic or hydraulic means allowing the selective positioning of the helicopter to simulate different flight conditions thereof.

The lower part of the structure is basically comprised of a base for supporting the system on the ground, such base being generally polygon-shaped. The base is provided with self-orientated wheels in order that such base may move in any direction on a horizontal plane. The size of the wheels is such that the base may easily change its direction without subjecting the pilot to any stress, and should have a size enough in order that the supporting structure may have smooth movement, even on rather rough surfaces.

The size of the base constituting the lower part of the structure gives sufficient stability thereto, i.e., its size is such that prevents overturning of the structure in reply to a sudden command during training, or due to any ground unevenness, particularly when the helicopter is positioned on the higher part of the structure.

In turn, the upper part of the structure is comprised by a rectangular frame, formed by an upper cross member the opposite ends of which are rigidly engaged to corresponding side vertical and extendible members, rigidly engaged at their lower part to opposite ends of a lower hollow cross member, the middle point of which is connected in a rotating manner to the center of the polygonal base, and located on a vertical rotation axis, which coincides with the axis of the helicopter mast, supported on said structure.

The frame upper cross member has at its middle point a crosshead constituting the supporting means for said helicopter, and which is engaged thereto, for allowing an articulated suspension thereof as per two orthogonal axes, i.e., allowing two freedom levels in its suspension.

The cross members and extendible side members of the frame thus form an integral unit, and the rotating engagement of the frame with the base allows joint rotation of the latter with respect of the helicopter, suspended by the crosshead, coinciding with said vertical axis; and in relation to the polygonal base, in permanent contact with the ground.

The crosshead forming part of the upper cross member of the frame has two articulation shafts coinciding with the transverse and longitudinal axes of the helicopter, the intersecting point of the crosshead axes coinciding with the axis of the mast of the main rotor of the helicopter.

Thus, the helicopter may be positioned at different tilting angles with respect to the frame, in order to simulate different positions of actual low speed translation, the rotating movement of the apparatus being in turn completely restricted with respect to the frame and to its vertical axis.

The object of the frame side extendible members is exerting at any time an upwards force tending to raise the helicopter, fixed to the upper cross member crosshead. As a consequence of the force developed by such members, the helicopter should exert a raising force corresponding to only a part of its total weight.

To fulfill its specific function, the side extendible members of the frame are comprised by corresponding pneumatic or hydraulic cylinders, and their operation, in respect of the helicopter, is selectively controlled by the trainer. Such members basically comprise cylinders rigidly engaged to the lower cross member of the frame, and corresponding pistons provided with corresponding rods, connected in turn to opposed ends of the upper cross member of the frame. In case a pneumatic system is used for the extendible members, pistons of the latter form in the cylinders thereof lower chambers in direct communication with a least a reservoir containing air under a determined working pressure, constituted by the lower hollow cross member of the frame in direct communication with a reservoir of pressurized air, in order to maintain a stable pressure in the cylinders and supporting the frame at the sides. The upper chambers of the cylinders limited by the pistons are in direct communication to atmosphere. The lower hollow cross member, the reservoir of pressurized air connected thereto, and the lower chambers of the extendible member cylinders, form a space containing air at a desired pressure for closed work, i.e. with no kind of external supply. In order to obtain the required pressure into such space, a compressor is used feeding the reservoir until the working pressure is reached, upon which the system operates without any kind of external pressurized air supply, since the capacity of the pressurized space is enough for causing displacement of pistons and their rods simultaneously.

In an alternative embodiment, the cylinder lower chambers of the extendible members are directly communication with a reservoir containing air under a pre-determined or desired working pressure, constituted by a lower hollow cross member of the frame divided into two parts by a partition, and connected therebetween by a conduit containing a valve, which may be selectively operated manually, making possible selecting between two air volumes under different pressure for working movement of the extendible members. This embodiment allows: a) selecting an air volume under lower pressure to cause a pressure drop while members are extending, i.e. a decrease in the force of the members when they have extended to their maximum, the for exerted thereby is very low, and thus, the pressure adopted allows automatic "height limit" for the system; b) selecting an air volume under higher pressure, such that whatever the extension of the members may be, noticeable pressure drops are not recorded, i.e. variations in the stress of the members whichever the height of the helicopter may be; for the pilot the weight of the helicopter will be the same. In case a hydraulic system is used, the side members cylinders are fed by a hydraulic pump by the use of a valve for regulating fluid pressure in order that the cylinder pressure be constant. The embodiment thus generally described is completed with the addition of a helicopter, which is adapted by means of few modifications for the correct operation of the training system, and consisting, basically, in extending the mast length to avoid interferences with the frame; incorporating anchoring means to fix it to the crosshead; increasing the tread of landing shoes to house the polygonal base which should have dimensions according to the desired stability; and, eventually, incorporating means for limiting the power available in order to avoid a possible raising of the structure of the system of the invention.

As auxiliary safety elements of the system of the invention, a device for limiting the raising height of the helicopter may be included, adjustable before starting the training, by electronic control of commands or by limiting the stroke of the extendible members, in order to diminish turnover possibility due to a bad command; a centrifugal brake, on the rotary joint of the frame with respect to the base in order to avoid exceeding a determined rotation speed, considered as a safe operation limit; a means for controlling the passage of the fluid under pressure, between cylinders of the extendible members and the fluid reservoir, in order to avoid sudden raising or lowering movements affecting maneuverability of the helicopter; and a means for dampening the end of stroke of the extendible members, preventing the sudden contact of the helicopter with the upper stroke stop and also preventing the contact with ground at an improper speed.

The problems solved by the system of the invention and the advantages thereof may be summarized as follows:

a) Possibility of determining the portion of the helicopter weight which should exert the system for a raising movement gives a broad range of training alternatives. For example, for a beginner, it is possible to select a force at the extendible member cylinders equivalent to 80% of the helicopter weight, therefore being 20% of thrust of the main rotor, in order to raise the helicopter.

With such a thrust on the rotor is not possible to shift the system over a horizontal plane, whichever the position of the cyclic lever is.

On the contrary, a skilled trainee may effect practice with the cylinders of the extendible members without fluid pressure, i.e. practically discharged. In order to raise the helicopter, a force identical to that required during free flight should be exerted and, therefore, the suspension system of the helicopter will be sensitive to the command of the cyclic lever since the base weight, part of the frame weight and the force exerted by the cylinder act on the polygonal base with self-oriented wheels.

b) The cost of training pilots is considerably reduced; the initial cost of the equipment is reasonable low since the helicopter may be small, of low power; the operating cost is low due to the fact that maintenance required is much less than that for a common helicopter, and it is not necessary that the skilled trainer be a flight instructor.

c) It is a basic tool for a pilot trainee, in order to become familiar with the commands since it may be controlled and due to the sensitivity to command movements.

d) It allows operating under absolute safety conditions and the trainee is not subjected to the nervous sensations of the first flights and may understand the helicopter behavior easily.

e) Since the system is always on the ground, it is possible, through additional means, that the trainer simulate emergency situations for trainee, causing failures or altering the instrument board indications. For example, it is possible to carry out the emergency operation called "ground self-rotation", required in case of a fail in the power supply and the helicopter is effecting a stationary flight, at a height of a few meters or, by means of a clutch at the command shaft of the tail rotor, simulate loss thereof.

Practice of such operations, dangerous for equipment and personnel and sometimes forbidden for some helicopter models, may be effected under absolutely safe conditions with the system of the invention.

Consequently, the invention relates to a system for training helicopter pilots, particularly, a system for complementing present methods for training pilots in helicopters, characterized by comprising, in combination, a structure for simulating the behavior of a helicopter under actual flight, preferably under stationary and translation flight, at low speed, without raising from the ground; and by a conventional helicopter provided with anchoring means to be anchored to said structure, the structure being comprised by a lower part forming a permanent supporting base for the structure and provided with self-oriented means for displacing the structure on a horizontal plane, and by an upper part constituted by a frame, preferably of rectangular shape, provided at the lower part with a vertical shaft mounted for free rotation on a support, also vertical, of said structure base, said frame being comprised by a hollow lower cross member, said vertical shaft of the frame being integral with said cross member, and being connected thereto at the middle point of said lower cross member; an upper cross member parallel to the later and a pair of extendible, vertical side members engaged respectively to opposite ends of the lower cross member, with corresponding ends of the upper cross member, means for positioning in a transverse and longitudinal angle, said helicopter being mounted on the upper cross member, such means being constituted by a crosshead carrying a tubular member for engaging the anchoring means of said helicopter, the mast of which passes coaxially and freely said tubular member, said crosshead having a first pair of joint journals engaged to the upper cross member and a second pair of journals located orthogonal with respect to the first pair engaged to said tubular member, the axis of said pair of journals being coplanar with respect to the transverse and longitudinal shafts of the helicopter, and the intersection point coinciding with the axis of the rotation axis of the frame, the side members of the latter being constituted by corresponding cylinders, rigidly connected to the lower hollow cross member, and by corresponding rods engaged, on one side, to the upper cross member and, on the other side, to pistons of said cylinders, the pistons forming therein corresponding upper chambers communicating to atmosphere, and lower chambers communicating to a reservoir containing fluid under a determined pressure, limited by at least said lower hollow cross member of the frame, said lower chambers of the cylinders being permanently pressurized by said fluid in order to generate in said rods a force proportional to said pressure, counteracting the helicopter weight for positioning the latter along the vertical shaft, coinciding with the rotating axis of the frame.

The invention also comprises other accessory objects which will be understood upon considering the specification below.

BRIEF DESCRIPTION OF THE DRAWINGS

FIG. 1 is a schematic perspective view of the system for training helicopter pilots, showing part of the latter.

FIG. 2 is a side elevational view of the system of the invention showing the forming elements thereof, schematically inter-engaged.

FIGS. 3 and 4 are plan and front elevational vies of the invention.

FIGS. 5 and 6 are a cross section of one of the frame extendible side members of the system and a front view thereof.

FIG. 9 is a detailed view of the mounting of FIG. 8, showing in a partial section the helicopter joint crosshead and its joint with the helicopter.

FIG. 11 is an alternative embodiment of the extendible side members of the frame.

Figure 7:
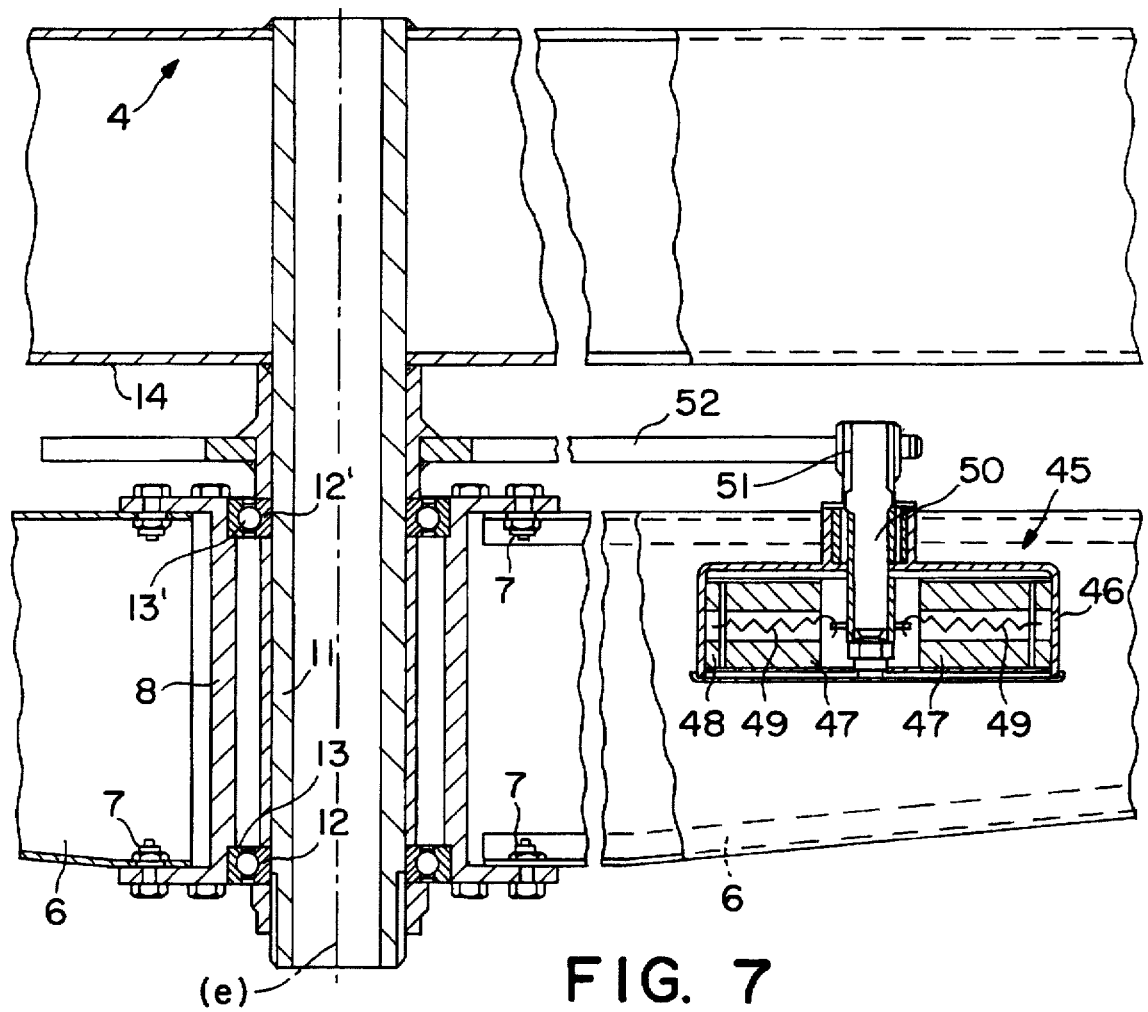
FIG. 7 is a detailed cross section of the rotary joint of the lower frame cross member with the polygonal base of the system.

(a) vertical flight;

(b) translation flight, and (c) side translation flight, in reply to the position of the system components during pilot training; and FIG. 13 shows different operating conditions of a helicopter under free flight which are simulated by the system of the invention.

In all figures, the same reference numerals designate the same or equivalent parts.

DETAILED DESCRIPTION OF THE INVENTION

Particularly, with reference to FIGS. 1 to 10, the system for training helicopter pilots according to the invention is basically comprised by a structure for supporting the helicopter, designated with reference 1 and by a conventional helicopter 2 (FIGS. 2 to 4).

The suspension structure 1 is comprised by two part, a lower part 3 forming a bearing base on the ground s and an upper part 4 as a rectangular frame, from which said helicopter 2 is suspended.

The lower part 3 forming the base is comprised by a polygonal profiled assembly, constituted by a perimetral profile 5 having hexagonal or octagonal contour and by a series of profiles 6, distributed radially from the peaks of the perimetral profile 5, and which are inclined and convergent towards the center of the lower part 3, wherein they are rigidly connected by means of screws 7 to end and opposite flanges of a tubular hub 8 the axis e of which is vertical.

In correspondence with the perimetral profile peaks 5, there are jointly fixed supports 9 of corresponding wheels 10 allowing easy steering changes of the system during movements, without subjecting the pilot to any strange feeling. These wheels 10 have a size according to the size of the structure 1 and to the helicopter pitch 2, such as to allow smooth movements on the ground surface s.

The lower part 3 or base of the system has the proper size for providing the stability required to the upper part or frame 4, when the helicopter 2 is fixed thereto under operating conditions, i.e. that its size should absorb any turnover in reply to sudden commands during training or, eventually, due to unevenness of the ground and, particularly, as may be seen when the helicopter is raised.

Tubular hub 8 at the lower part or base 3 is supported by the upper part 4 of the structure 1, free rotating, around the vertical axis e of said hub 8. The upper part or frame 4 comprises to this end a tubular shaft 11 positioned coaxially with respect to hub 8, and being free rotating on bearings 12–12' mounted on corresponding end seats 13–13' inside the hub 8.

This tubular shaft 11 extends beyond the lower part 3 and is connected to a hollow cylindrical lower cross member 14 forming the upper part or frame 4 and being sealingly closed by its opposite ends.

The hollow lower cross member 14 is connected at its opposite ends to lower ends of corresponding vertical extendible members 15 the upper ends of which are solidary to an upper cross member 16 of the frame.

Each of the vertical extendible members 15 is constituted by a cylinder 17 which passes through the end portion of the lower cross member 14, perpendicular thereto, and which is closed by a lower head 18 fixed to the hollow cross member by means of block 19. At block 19 it is fixed by welding at the lower end of the cylinder 17 which, in turn, is fixed to the upper part of cross member 14 by means of a sleeve 20.

Cylinder 17 has its upper end spaced with respect to the upper cross member 16 and comprises therein a piston 21 connected to a rod 22 passing through a cover 23 of the upper end of the cylinder 17, provided with sealing means 24, the rod 22 being solidary to the upper cross member 16 of the frame.

Each of heads 18 of extendible members 15 comprises a cylindrical cavity 25, coaxial with an extension 26 projecting from the lower face 21' of pistons 21 of each cylinder 17.

These extensions 26 are coaxial to rods 22 and correspond to cavities 25 of blocks 18, which are closed at the upper part by resilient material membranes 27 (see FIG. 5), and forming a dampening means for the stroke end of pistons 21.

Cavities 25 of heads 18 are communicated with a conduit 28 communicating cavities 25 through heads 18 and blocks 19, to the interior of the hollow cylindrical lower cross member 14. Conduit 28 of heads 18 is, in turn, connected to cylinders 17 by a conduit 28" which ends into the lower chamber 17' of cylinders 17, i.e. against the lower face 21' of pistons 21.

The hollow lower cross member 14 is tightly closed at its ends and communicates with an outer reservoir 29 containing pressurized fluid, which is solidary to frame 4, such that the pressurized fluid be confined into a housing formed by said reservoir 29, by said hollow lower cross member 14 and by lower chambers 17' of cylinders 17, the upper chambers of which 17" are communicated to the atmosphere. Reservoir 29 should be large enough for avoiding significative pressure variations at the hollow cross member 14 and into chambers 17' of cylinders 17, said housing being loaded with the required pressure by a compressor not shown. The housing formed by the hollow cross member 14, chambers 17' and reservoir 29 is closed, and the compressor is only used for obtaining the required working pressure, i.e. the compressor feeds the pressurized fluid reservoir the latter operating without any kind of outer fluid. The upper cross member 16 of the upper part or frame 4 of structure 1 is constituted by a pair of hollow profiled members, having a rectangular cross section (30-30') which extends parallel and spaced therebetween, the opposite ends of said members being joined by corresponding bridge plates 31, engaged to said members 30-30' by means of screws 32.

Bridge plates 31 have through holes 32 and lower sleeves 33 with tapered surfaces 34 for bearing and fitting of the tapered portions 22' of rods 22 of extendible members 15, said rods 22 being solidary to bridge plates 31, by means of nuts 34, threaded to end portions of said rods 22, thus forming an integral rigid assembly, subject to the desired fluid pressure, from the lower chambers 17' of cylinders 17, between the profiled members 30-30' and rods 22 of the extendible members 15.

Both profiled members 30-30' of upper cross member 16 have on opposite faces thereof corresponding plates 35 which project downwards from said profiled members 30-30' and which are located at an intermediate point thereof.

These plates 35, contained on parallel planes, form supporting means for a crosshead, indicated with numeral 36, this being constituted by an outer ring 37, jointed to plates 35 of each profiled member 30-30' by means of a first pair of journals 38, which are coaxial and transverse to said members 30-30'.

Figure 10:
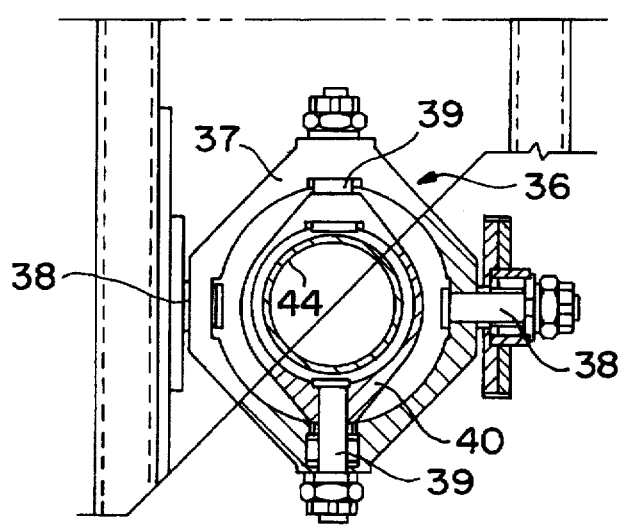
FIG. 10 shows a cross section along line I—I of FIG. 8.
Figure 8:
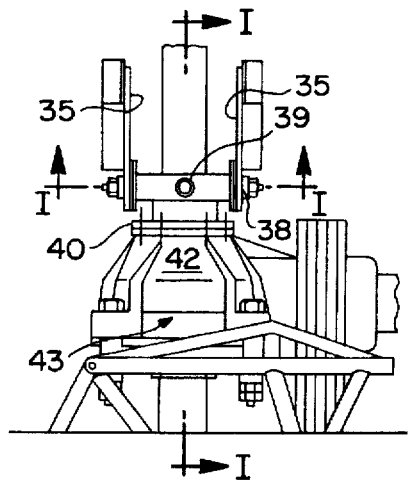
FIG. 8 is a side elevational view of the mounting of the helicopter with respect to the upper cross-member thereof.
Figure 13E:
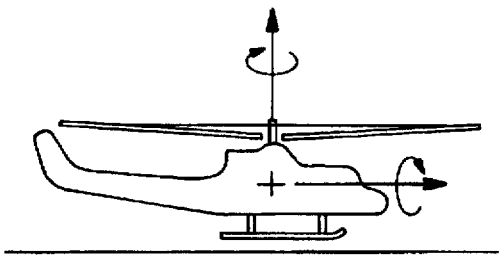
Figure 13F:
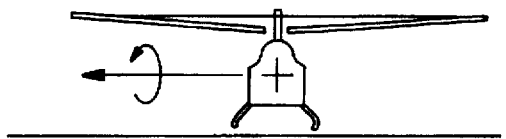
Figure 13A:
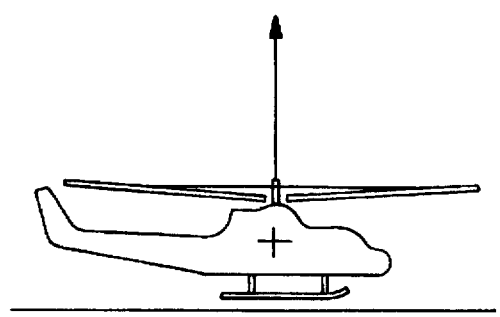
Figure 13B:
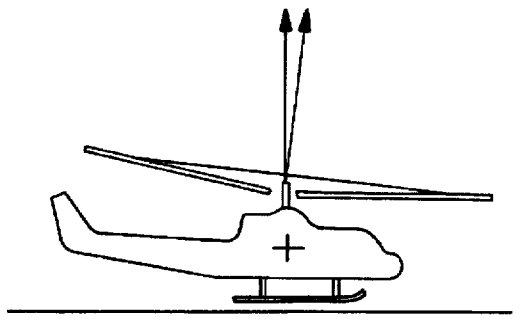
Figure 13C:
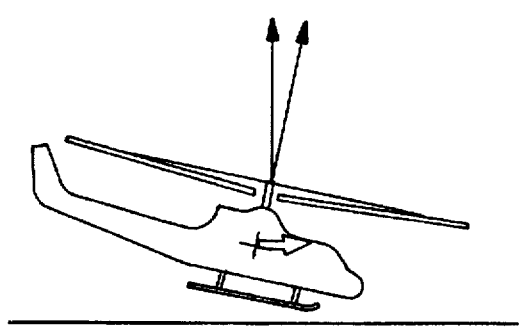
Figure 13D:
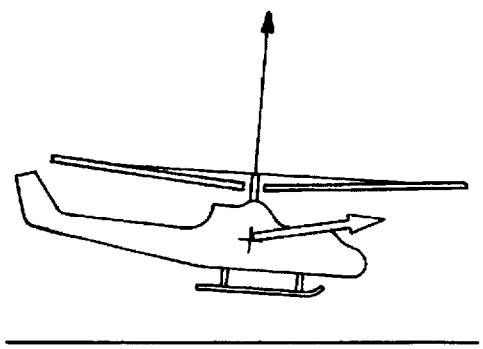

The outer ring 37 has, in turn, a second pair of journals 39, coaxial and orthogonal with respect to the first pair of journals 38, wherein opposite sides of a tubular support articulate 40, the tubular support having a flange 1 to be fixed to housing 42 of the gear box 43 of the main rotor of the conventional helicopter 2, the mast 44 or rotor shaft of which freely passes through the tubular support 40 (see detail FIGS. 8-9 and 10).

The axis of the first pair of journals 38 and the second pair 39 of journals of crosshead 36 coincide with the transverse and longitudinal axis of the helicopter 2, and at the intersection point of said axes the axis of the helicopter mast 44 exists suspended from the tubular support 40.

Therefore, helicopter 2 is free to swing with respect to the upper part or frame 4, as per its transverse and longitudinal axes, having enough space to adopt tilting angles corresponding to an apparatus under translation flight at low speed. The rotating movement of helicopter 2 with respect to frame 4 on its vertical axis is completely restricted by a braking device 45 (FIG. 7). The only modifications required for adapting the helicopter 2 with respect to frame 4 are, eventually, extension of the mast 44, adaptation of the tubular support 40 to the helicopter structure 2 and an increase in the tread of the landing shoes p in order to house therebetween the lower part or base 3. In an alternative embodiment, FIG. 11, lower chambers 17 of cylinders 17 of vertical extendible members 15 are communicated to a pressurized fluid reservoir formed by a hollow lower cross member 14', divided longitudinally by a partition 14a limiting it, a pair of compartments 29'-29", as reservoirs of different volumes of pressurized air, smaller and larger, respectively. These compartments 29'-29" are connected therebetween by a conduit c in which there is a valve v which may be operated selectively by the trainer. The trainer may select one of two pressurized fluid volumes in order to actuate the extendible members 14 and their object is as follows: a) if the lower volume is used, a notorious pressure drop takes place as extendible members (15) extend and, consequently, the force exerted when they extend to the maximum is low, and if the pressure selected is the proper one, a "height limit" is used; b) if the larger volume is connected by means of valve v, no pressure drops exist, i.e., the stress of the members 15 does not vary which the height of the helicopter may be, the weight thereof will be the same. The braking device 45 avoids overspeed of frame 4 with respect to the base 3, around the tubular shaft 11 and may be comprised by a centrifugal brake mounted on the base 3 which comprises a box 46 inside which a pair of bodies 47 are mounted, in front of a brake shoe 48 and connected by springs 49 to a shaft 50 which has an end pinion 51 which meshes with a crown 52 fixed to the tubular shaft 11 of frame 4. The braking device 45, secured to shaft 11, prevents overpassing the frame rotation speed considered as the limit speed for safe operation.

Structure 1 disclosed is for training pilots and uses a conventional helicopter 2, but before disclosing its operation, some considerations should be made regarding the flight mechanics of this kind of vehicle.

Helicopters having a main vertical shaft rotor and a tail horizontal shaft rotor, being driven by the power supplied to their shafts by the engine or engines included in the helicopter are considered conventional. This does not mean that the system of the invention is limited to this kind of helicopters.

The main rotor generates the power supporting the helicopter and the pilot, by means of main rotor commands controls the magnitude and direction of the force generated for said rotor, thus determining the movement of the helicopter. The main rotor commands control the thrust generated by the rotor, acting on the blades pitch, the pitch being the angle formed by the blade and the rotating plane thereof, i.e. the angle between the cord of each blade section and the trajectory thereof. Under certain conditions, it may be said that the larger the pitch the larger the sustainment obtained.

Basically, commands of the main rotor are two: "collective pitch command" and "cyclic pitch command"; and the rotor is designed in such a way that in order not to compromise its operation, the rotating speed thereof should be maintained within a particular range. This is attained by means of a power control of the engine, manually or automatically; in case of manual control, as the cyclic lever is raised, a device accelerates the engine, i.e., increases the power delivered for maintaining the rotating speed in the rotor and, as this is not enough, as a rotating speed control the pilot has a hand accelerator in the same lever allowing the required corrections.

The collective pitch command acts on the pitch equally on both blades, regardless the azimuth position thereof. This command is driven by the pilot, through the left lever. This command increases and decreases blade pitch, i.e. increases or decreases the thrust generated by the rotor, in other words, it acts on the magnitude of the force vector of the rotor.

On the other hand, the cyclic pitch command acts varying the pitch as a function of the azimuth position of each blade, this command being driven by the pilot through the lever between his legs. Upon tilting the lever to any azimuth direction, the blade losses pitch on said direction and increases it in the opposite position thus maintaining the average pitch. In other words, the collective pitch command acts on the direction of the force vector of the rotor.

FIG. 13 shows the different operating conditions of an helicopter when flying: (a) making stationary flight wherein the rotor exerts a vertical thrust equal to the weight of the helicopter, the blade pitch is the same in the whole azimuth, i.e. the cyclic pitch lever is in its neutral position. For ascending or descending, the pilot will only actuate the collective pitch lever.

(b), (c) and (d) represent the beginning of the translation flight, low speed translation and translation with ascending higher speed. For the translation flight, the pilot will tilt the cyclic pitch lever towards the desired direction, the azimuth variation of the pitch will tilt the force exerted by the rotor, thus appearing a horizontal component accelerating the helicopter in the same direction. If the pilot wishes that the helicopter maintain the height, he will also actuate the collective pitch lever for maintaining the vertical thrust component of the rotor equal to the pitch. Further, by means of pedals the pilot may control the tail rotor.

The tail rotor counteracts torque supplied by the main rotor which tends to turn the whole helicopter, (e), therefore it is also called anti-torque rotor, or it will produce pitching such as that shown in (f).

Figure 12A:
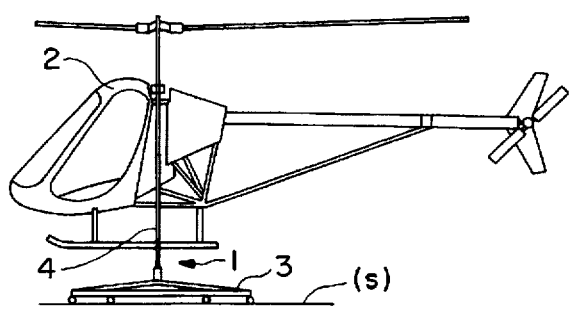
FIG. 12 shows the different positions adopted by the helicopter.
Figure 12B:
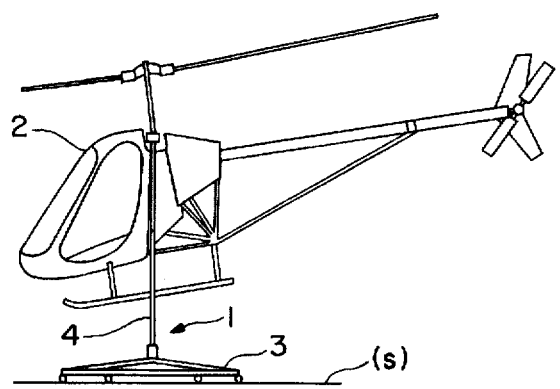
Figure 12C:
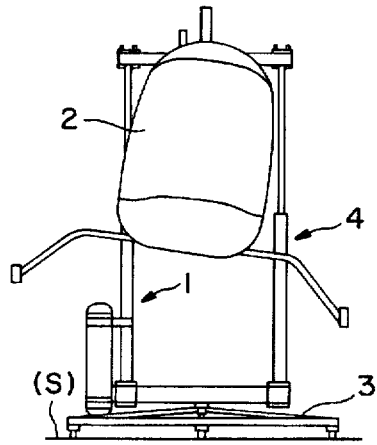

The above comments related to the flight mechanism of a conventional helicopter will facilitate understanding the operation of the system of the invention, shown in FIG. 12 a'-b'-c' with a helicopter of the mentioned kind. In this figure the system is in a' with an helicopter 2 simulating vertical flight; in b' simulating a translation forward flight and in c' in a side translation flight.

In order to simulate these conditions during stationary flights, it is required that the system permits small translation movements at low speed and, to this end, the system comprises a rolling base or shiftable lower part 3 and vertical members 15 extendible by fluid pressure from reservoir 29.

The basic advantages of the system of the invention in connection with the training into a free flight helicopter, may be summarized as follows:

1) By means of the use of the system of the invention, contact with the ground is maintained at any time. This allows, among other things, the use of a power-off switch, remote commanded, without sophisticated technical elements.

2) It is possible to limit the maximum raising height at any range from zero to about one meter, before flight, according to the skillness of the pilot.

3) The complexity of driving may be varied from a very low level to a level close to that of the flight of an actual helicopter.

The system proposed is designed such that there is no other command for the pilot apart from those of any conventional helicopter. I. e. there is no connection between the helicopter command and any external element, forming part of the system; forces required for producing movements and changes are generated by the helicopter per se 2.

As may be seen in FIG. 12, when helicopter 2 raises, vertical and extendible members 15 of frame 4 extend simultaneously, due to the pressure to which their pistons (21) are subjected to permanently by means of the pressurized fluid contained into cross member 14, reservoir 29 and chambers 17', this resulting in tat the base 3 is always in contact with the ground s.

When helicopter 2 is tilted (FIG. 12b', in response to commands corresponding to the longitudinal and transverse shafts, crosshead 36 to which it is connected this being the only connection between the helicopter and the frame 4, absolute freedom of movements exist such that the helicopter acquires the require action for shifting flights.

This engagement of the crosshead 36 with helicopter 2 allows, when the helicopter turns with respect to its vertical shaft (FIG. 13 (e), dragging of frame 4 since, for this movement the joint between helicopter 2 and frame 4 by crosshead 36 behaves rigidly. Under such movement, the base 3 remains fixed since frame 4 is joined to the latter by means of the tubular shaft 11 supported rotatingly on bearings 12–12' of hub 8 forming part of base 3. Lastly, when helicopter 2 is under translation flight, it obviously drags structure 1, frame 4 and the base 3 which displaces by means of the wheels 10.

Summarizing, and according to FIG. 12: (1) when the helicopter 2 raises as in (a) vertical members 15 extend automatically and base 3 bears on its wheels on the ground s.

(2) when helicopter 2 moves(c) it is required that rotor and helicopter are tilted, this being caused by crosshead 36. This tilting of the rotor is necessary in order that the force exerted thereby may have a horizontal component, and crosshead 36 engaging helicopter 2 with the upper cross member 16, allows this tilting, namely forwardly, rearwardly and toward the sides.

Wheels 10 of base 3 are, therefore, the only elements contacting the ground s when the helicopter 1 raises in the structure 1. This determines shifting of the whole structure 1 simulating the free movement of a helicopter 2.

(3) Rotation of helicopter 2, FIG. 12 (e) about its vertical shaft caused by the tail rotor force is carried out by the helicopter along with frame 4, due to the rigid connection formed by the crosshead 36 and the helicopter. Base 3 will remain without movement since frame 4 is connected through the tubular shaft 11, welded to the lower hollow cross member 14 forming the pressurized housing in close communication with reservoir 29.

Vertical elements 15 have their lower chambers 17' directly connected to said cross member 14 and reservoir 29 by the latter in order to form a closed pneumatic system. This system comprises a pressure gage 8 m), a load valve (v) and an overpressure relief valve (not shown) are directly connected to the reservoir 29, i.e. the pressure is supplied by external means before starting the helicopter 2.

Pistons 21 of extendible members 15 exert permanently an ascending force which tends to raise helicopter 2, and which is directly proportional to the pressure selected by the trainer, and should be such that the force of both pistons 21 be not higher than the helicopter weight 2, in order the helicopter be maintained supported by base 3 on the ground (s) when it is resting.

Since part of the helicopter weight is supported by vertical members 15 through fluid pressure, in order to simulate "take-off" the rotor should only apply part of the strength required during free flight, and this part of the stress is selected by the trainer.

Since the pneumatic system comprised by reservoir 29, hollow lower cross member 14 and cylinders 17 is closed, when members 15 extend in response to the helicopter lifting 2, the system volume increases and this implies a decrease in the pressure thereof and, consequently, in the force exerted by pistons 21 and rods 22. This is overcome dividing internally the cross member 14' (FIG. 11) into two parts (29'-29") communicated by means of a valve v allowing working with the total volume or with partial volume.

When the complete reservoir is used, the volume thereof is enough for the variation of the system volume not being significant; this determines, upon raising of the helicopter, that the force exerted by members 15 does not vary significantly, i.e. will not be noticed by the pilot. On the contrary, when a partial volume is used, the extension of members 15 will cause a noticeable drop of the force exerted.

According to the above, two basic concepts govern the operating features of the vertical members 15 of frame 4 supporting the helicopter 2:

1) Selection of the force exerted by cylinders 17, according to the selected pressure;

2) Selection of the force exerted by cylinders 17, taking into account its decrease as members 15 are extended, or, on the contrary, if pressure should remain constant according to the selected working volume.

These features, added to the power limitation of the helicopter engine 2 to a value such that it is not capable of raising per se, and the structure 1 of the system, are those providing the required variables for adapting the assembly to the skillness of the pilot.

Thus, a pressure such that between both cylinders 17 the resulting force is 80% of that required for raising the helicopter 2, the rotor should exert only 20% of said force. Therefore, the helicopter 2 may raise and lower easily, and further in case of "falling" due to mechanical problems, or due to improper driving of the pilot, the impact will be from a low height, obviously, one meter maximum, and will be the equivalent to that of a helicopter weighing 20% of the actual weight, since at any time cylinders 17 will support the remaining 80% thus eliminating risks of damage for personnel or equipment in case of falling.

As previously stated, for a translation flight, helicopter 2 and its rotor should tilt in order to have sufficient horizontal force towards the direction in which translation is to be effected. This required horizontal force has the same value, for the free helicopter as well as for the helicopter 2 secured to structure 1 of the system of the invention, since in the latter force is only supplied through cylinders 17 and also in a vertical direction. Thus, with this force ratio of the example (80% to 20%), given a particular rotor tilting, this would be exerting only a 20% of the horizontal component which it would exert upon free flight; the force will not be sufficient and structure 1 of the system will remain in place or will just move even though the pilot actuates the cyclic command.

Lastly, on the tail rotor command there will be no significant differences as compared to a free helicopter, except for the fact that it has a centrifugal brake 45 avoiding the helicopter adopting high rotation speeds about its vertical shaft (tubular shaft 11), affecting safety. The pilot will control the power, the collective pitch and the tail rotor, the cyclic pitch being released.

If the skillness of the pilot is sufficient force ratio selected in the former example might be reversed, i.e., 20% of the force would be supplied by cylinder 17 and 80% by the rotor.

In this case, the pilot will feel practically in a free flight (always referring to stationary or low speed flights) while being sure that the helicopter will never raise more than one meter from the ground, even though commands are actuated erroneously.

The fact that in order to translate it is required to drag the base 3 does not differentiate the system of the invention from that of a free helicopter, since on wheels 10 only the base weight 3 plus the lower weight 3 of frame 4 and 20% of the helicopter weight 2 would only act, and this value does not affect smoothness and steering of the required movement.

Many alternatives are possible, as desired by the trainer, all of them depending exclusively on the pneumatic pressure adopted for the system and in no case this system may be used without pressure.

A pressure lower than that desired is not recommended, in order that the two cylinders 17 may supply a force equivalent to 20% of the total required. This allows that the possibility of complete raising of the system be eliminated, by limiting the power command, a safety margin would be between 80% of the weight which should be lifted naturally and 100% plus the base weight 3 and the lower part of the frame 4 which in no case should be raised.

The invention will be clearly understood for those skilled in the art.

The invention is only limited by scope of the attached claims.

I claim:

1. A system for training helicopter pilots, particularly, a system for complementing present methods for training pilots in helicopters, comprising, in combination: a device for simulating the behavior of a helicopter under actual flight, without raising from the ground; and a conventional helicopter having a mast or rotor shaft and being provided with anchoring means anchored to said device; the device being comprised of a lower part forming a permanent supporting base for the structure and provided with self-oriented means for displacing the structure on a horizontal plane; an upper part having a frame, including a vertical shaft on the lower part mounted for free rotation on a vertical support of said base; said frame including a hollow lower cross member, said vertical shaft being integral with said cross member and being connected thereto at the middle point of said lower cross member; an upper cross member parallel to the lower cross member; a pair of extendible, vertical side members engaged respectively to opposite ends of the lower cross member; means for angularly positioning said helicopter, said means being mounted on the upper cross member, said means including a crosshead carrying a tubular member for engaging the anchoring means of said helicopter, the mast of said helicopter passing coaxially and freely through said tubular member; said crosshead having a first pair of joint journals engaged to the upper cross member and a second pair of journals located orthogonally with respect to the first pair engaged to said tubular member, the axis of said pair of journals being coplanar with respect to the transverse and longitudinal shafts of the helicopter, and the intersection point coinciding with the axis of the rotation axis of the frame; the side members of the frame including cylinders, rigidly connected to the lower hollow cross member, and including rods engaged, on one side, connected to the upper cross member and, on the other side, connected to pistons of said cylinders, the pistons forming therein corresponding upper chambers communicating with the atmosphere, and lower chambers communicating with a reservoir containing a fluid under a determined pressure, limited by at least said lower hollow cross member of the frame; said lower chambers of the cylinders being permanently pressurized by said fluid in order to generate in said rods a force proportional to said pressure, counteracting the helicopter weight for positioning the latter along the vertical shaft, coinciding with the rotating axis of the frame.

2. A system as claimed in claim 1, wherein said lower part of the device, has a polygonal shape and includes a perimetral profile connected by converging radial profiles with a connecting support for the frame rotating shaft, constituted by a tubular hub having flanges for fixing radial profiles of the base.

3. A system as claimed in claim 1, including a tubular hub with end seats for corresponding bearings giving rotating support to said frame shaft, secured to said lower cross member, and provided with a tubular sleeve, said frame shaft having a lower end thread for receiving a nut retaining the shaft in said hub.

4. A system as claimed in claim 1, wherein said frame rotating shaft comprises, over the supporting hub thereof, a sprocket meshing with a pinion of a centrifugal brake, mounted on said base, capable of limiting the rotating speed of the frame.

5. A system as claimed in claim 1, wherein said frame lower cross member has opposite ends thereof and is of hollow, cylindrical shape and on said opposite ends is crossed by the cylinders of the frame side members, said cylinders being closed by end blocks of the lower hollow cross member, against which heads are secured, located outside said cross member, each head having a cylindrical cavity, coaxial to the cylinder axis, connected by means of a first conduit, through the block fixing the head, to the interior of the lower hollow cross member, each head having a second permanent communication conduit with the lower chamber of said cylinders, said head cavity being closed by a resilient material membrane, corresponding to a lower extension of the piston to form, combined with the pressurized fluid contained in said hollow cross member, a means for dampening the end of stroke of the pistons.

6. A system as claimed in claim 1, wherein said frame upper cross member includes a pair of hollow, parallel, profiled, separated members, between which said helicopter mast projects, and which are engaged at their ends by corresponding bridge plates, the latter having corresponding sleeves with interior tapered surfaces for supporting end tapered portions of said rods of the frame side members, said rods projecting through the bridge plates for being secured thereagainst by nuts threaded to said rods.

7. A system as claimed in claim 1, wherein said base is polygonal and said polygonal base comprises said auto-oriented means constituted by wheels mounted on supports joined for free rotation on the perimetral profile of the base.

8. A system as claimed in claim 1, wherein said base includes shifting means for sliding over a water basin.

9. A system as claimed in claim 1, wherein said reservoir for pressurized fluid is a container of pressurized air formed by said lower cross member and an air reservoir in direct communication therewith, to compensate pressure variations in the cylinders of the extendible members.

10. A system as claimed in claim 1, wherein said reservoir for pressurized fluid is a container confining a hydraulic fluid constituted by said lower hollow cross member, having a conduit for fluid inlet, closed by a valve regulating the pressure upon filling to working pressure by a hydraulic pump.

11. A system as claimed in claim 1, wherein said reservoir for pressurized fluid is formed by said frame lower hollow cross member, divided longitudinally by a partition forming a pair of reservoirs of different volumes for said fluid, the lower volume reservoir being in direct communication with the cylinders of extendible members, and the higher volume reservoir through one conduit, wherein a by-pass valve is included which may be selectively operated by the user.

12. A system as claimed in claim 1, wherein said crosshead carrying the tubular member engaging the helicopter anchoring means comprises a ring joined at opposite sides thereof by said first pair of journals to corresponding plates, fixed to facing surfaces of the members forming the upper cross member, the second pair of journals being mounted on the sides of said ring, displaces 90° with respect to the first pair of journals, remaining on the second pair of journals joined to diametrically opposed points of said tubular member.

13. A system as claimed in claim 1, wherein said tubular member engages the helicopter anchoring means and has a lower flange connected to the housing of the gear box of the main rotor of the helicopter.

14. A system as claimed in claim 1, wherein said device simulates the behavior of a helicopter under stationary and translational flight, under low speed.

15. A system as claimed in claim 1, wherein said frame is of rectangular shape.

* * * * *